(12) United States Patent
Bierhoff et al.

(10) Patent No.: US 6,865,343 B1
(45) Date of Patent: Mar. 8, 2005

(54) SIMULATION OF ELECTRO-OPTICAL CONNECTIONS THAT TAKES SPATIAL DIRECTION INTO CONSIDERATION

(75) Inventors: Thomas Bierhoff, Volkmarsen (DE); Elmar Griese, Paderborn (DE); Andreas Himmler, Paderborn (DE); Juergen Schrage, Lippstadt (DE); Amir Wallrabenstein, Oerlinghausen (DE)

(73) Assignee: Siemens Aktiengesellschaft, Münich (DE)

( * ) Notice: Subject to any disclaimer, the term of this patent is extended or adjusted under 35 U.S.C. 154(b) by 235 days.

(21) Appl. No.: 09/679,700

(22) Filed: Oct. 5, 2000

(30) Foreign Application Priority Data

Oct. 7, 1999 (DE) ......................................... 199 48 378

(51) Int. Cl.$^7$ ........................ H04B 10/08; H04B 10/12; H04B 17/00

(52) U.S. Cl. ......................... 398/25; 398/141; 398/142

(58) Field of Search ................................ 398/141, 142, 398/25

(56) References Cited

PUBLICATIONS

E. Conforti et al., "Issues in the Modeling of Fiber Optic Systems", SBM/IEEE MIT–S IMOC' 95, 1995.*
W. Wong et al., "Integrated Semiconductor Laser–Transmitter Model for Microwave–Optoelectronic Simulation Based on Transmission–Line Modeling", IEE Proc.–Optoelectron, vol. 146, No. 4, Aug. 1999.*

* cited by examiner

*Primary Examiner*—Jason Chan
*Assistant Examiner*—Shi K. Li
(74) *Attorney, Agent, or Firm*—Schiff Hardin LLP

(57) ABSTRACT

Simulation of the transmission behavior of opto-electronic connections, by which the transmitter or the receiver is represented by at least two optical outputs or inputs and the optical line is represented by corresponding multi-poles, considers the spatial distribution of the emitted or received optical radiation.

15 Claims, 2 Drawing Sheets

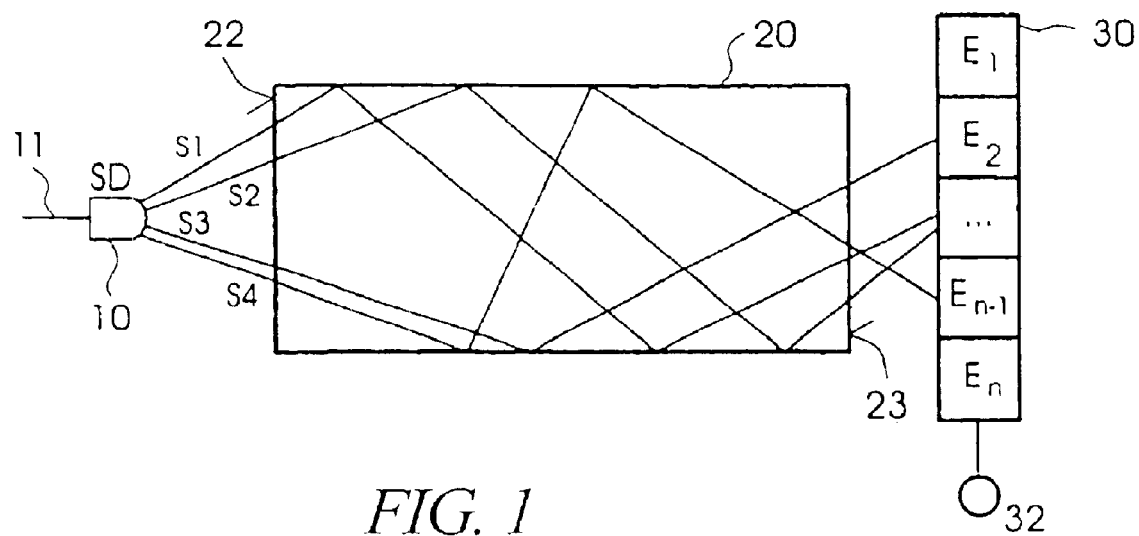
FIG. 1
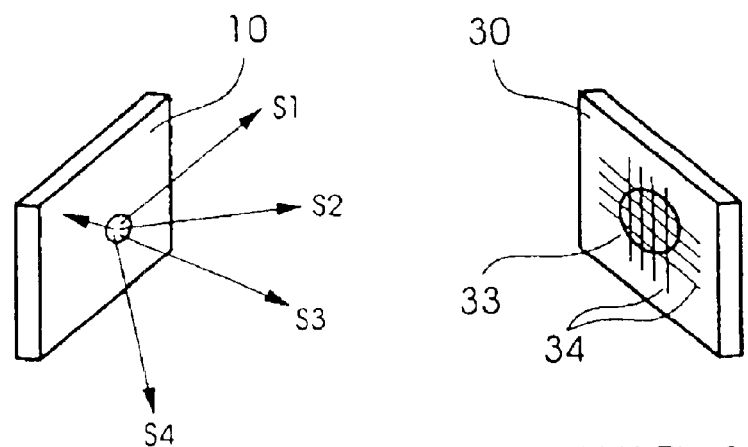
FIG. 2A
FIG. 2B

SIMULATION OF ELECTRO-OPTICAL CONNECTIONS THAT TAKES SPATIAL DIRECTION INTO CONSIDERATION

BACKGROUND OF THE INVENTION

1. Field of the Invention

The invention is directed to a method for determining the transmission behavior of electro-optical connections, particularly connections in the inside of devices.

2. Description of the Related Art

The article, "Verhaltensbeschreibung fur die Modellierung opto-elektronischer Systeme" by J. Becker, J. Haase and P. Schwarz, pp. 83–92 of the Conference Volume of the GMM-ITG-GI Workshop "Multi-Nature Systems" on 11 Feb. 1999 in Jena, herein incorporated by reference, discloses that a modelling of electro-optical transmission links can take place with network simulators known for electrical networks. A simple preferred model in which the entire radiant power generated at an output of an electro-optical transducer or, respectively, received, is simulated by a single node of the model. An as yet unpublished proposal is also mentioned at the bottom of page 86 in which a plurality of terminals are provided at the optical side with which different optical wavelengths are separately modelled. This version is of interest for wavelength-division multiplex methods that are utilized in the field of telecommunications.

The article by Th. Bierhoff et al., "An Approach to Model Wave Propagation in Highly Multimodal Optical Waveguides with Rough Surfaces" in Proc. X. Int. Symp. on Theoret. Electr. Eng., Magdeburg 1999, pp. 515–520, herein incorporated by reference, is cited for modelling transmission properties of optical multimode waveguides.

SUMMARY OF THE INVENTION

An object of the invention is to provide a method with which the transition into and out of the optical waveguide can be simulated, and a complex model of the optical waveguide or, respectively, of the entire optical transmission path can be utilized.

The invention is based on the fact that a division of the radiation into respectively predetermined spatial directions means a significant improvement of the model with respect to the transmitter and receiver. In this scheme, the improved model of the optical transmission link no longer represents a simple transmission quadripole (in the form of coupled dipoles) but a multi-pole with a transmission matrix. The example discussed below shows how model parameters are defined.

The method provides for simulating the transmission behavior of opto-electronic connections in which the transmitter or the receiver (or both) is represented by at least two optical outputs (transmitter) or, respectively, inputs (receiver), and the optical line is represented by corresponding multi-poles, by which the direction and the spatial distribution of the emitted (transmitter) or, respectively, received (receiver) radiation is taken into consideration.

Furthermore, features and advantages of the invention derive from the following description that, combined with the attached drawings, explains the invention on the basis of an exemplary embodiment.

BRIEF DESCRIPTION OF THE DRAWINGS

FIG. 1 is a schematic diagrams showing the structure of an arrangement to be simulated;

FIG. 2a is a pictorial diagram showing the preferred model for the transmitter;

FIG. 2b is a pictorial diagram showing the preferred model for the receiver;

DESCRIPTION OF THE PREFERRED EMBODIMENTS

Figure 3:
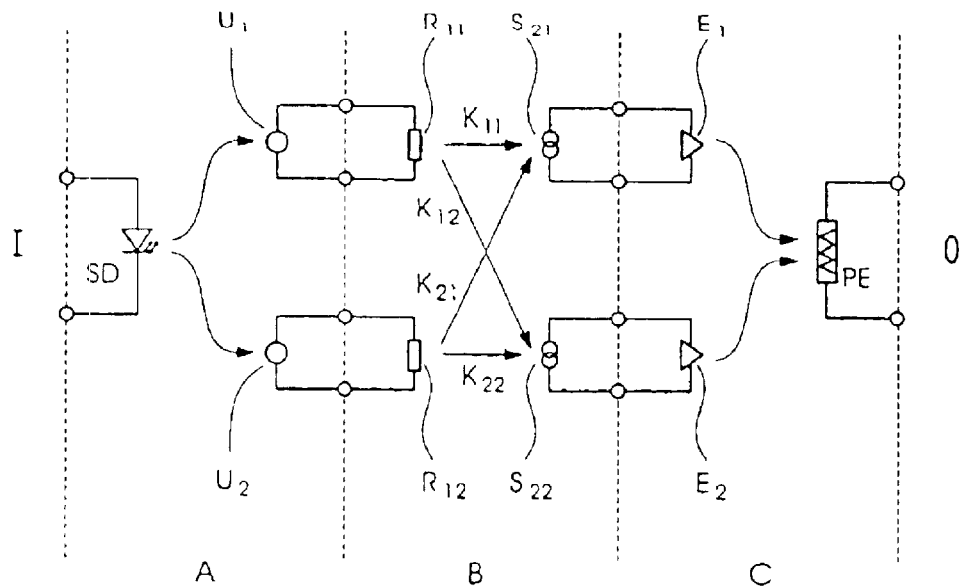
FIG. 3 is a schematic diagram of an electrical network that simulates the structure according to FIG. 1.

FIG. 1 illustrates, in a two-dimensional manner, an arrangement to be simulated. An electro-optical transmitter 10 has an electrical terminal 11. Vertically emitting laser diodes are preferably employed here, as widely known under the abbreviation VCSEL (vertical-cavity surface-emitting laser diodes). However, other optical sources (for example, edge emitters, LEDs, etc.) can also be utilized and modeled here.

A ray beam, illustrated by the rays S1, S2, S3 and S4, is emitted from this transmitter and is incident onto the input face 22 of a light conductor 20. The rays entering into the light conductor (illustrated by lines) are reflected by total reflection at the edge based on the principle of the light conductor and are potentially dispersed by roughness and emerge from the exit face 23 at the end of the light conductor; an input beam can also lead to a plurality of output beams in the case of light dispersion. They are then incident onto a receiver 30 that in turn produces an output 32 that corresponds to the optical powers incident onto the receiver 30 in the segments E1, E2, E3, . . . En-1, En.

It is already indicated in FIG. 1 that the receiver is envisioned to be composed of individual elements for the purpose of the invention. Since FIG. 1 is a two-dimensional projection, FIGS. 2a & 2b present the actual three-dimensional transmitter and receiver employed. In FIG. 2b, the receiver 30 in the model actually employed is a surface that is divided into sub-surfaces. This division is preferably a tiling with quadratic grid 34, as indicated in a perspective view in FIG. 2b.

Although the receiver is preferably modeled by a planar tiling, the transmitter as indicated in FIG. 1 and in FIG. 2a-preferably has a division in which the ray beams S1–S4 emanate from a common center.

This modeling corresponds to the fact that the transmitters presently preferred have an emission face that is small in relationship to the diameter of the light conductor, which is envisioned as punctiform in the model. However, surface radiators (with planar and arbitrarily curved surfaces) in which the individual rays do not proceed from a common point can also be modeled with the method.

The receivers, in contrast, have a significantly larger reception face 33 because the sensitivity increases with the area. This area is optimally only slightly larger than the exit face of the light conductor. Since the receiver is preferably a planar element, it is positioned immediately against the exit face; the spacing is shown disproportionately large in FIG. 1 for the sake of clarity.

FIG. 3 shows an electrical equivalent circuit diagram that corresponds to the simplest arrangement. This electrical network is divided into three regions A, B, and C, where A corresponds to the transmitter, B corresponds to the line and C corresponds to the receiver.

Input posts I that correspond to the electrical connection of the transmitter are present in the region A. They lead to the electrical model of a transmission diode SD that simulates the electrical properties at the input I, particularly the impedance, in a known way. An exact presentation can be derived from textbooks about electrical networks and the data sheets of the respective diodes. The current flowing through the diode SD controls the voltage sources U1 and U2 according to control characteristics. This is shown in FIG. 3 with the two arrows from the diode SD to the voltage sources U1 and U2. The optical transmission intensity is represented by the voltage at the voltage sources U1 and U2. As a rule, more than two voltage sources will be present; however, it is also possible to work with only two when the emitted optical power is to be described in only two spatial regions.

The input face of the light conductor modeled by the region B is divided into two regions in the model, these being representative of the input impedances R11 and R12. These particularly serve the purpose of modeling the transmission losses upon entry into the light conductor.

Analogously, output current sources S21 and S22 are provided for which current is defined via the coupling factors K11, K12, K21 and K22 of the currents by the input impedances R11 and R12. The coupling factors are preferably defined by beam tracking.

The opto-electrical receiver is modeled in region C of FIG. 3. The currents from the current sources S21 and S22 are impressed at the input posts (pairs), two input posts are shown in FIG. 3, but a plurality of input posts may be provided in a practical application corresponding to the selected tiling. These currents generate signals in the receivers E1 and E2 that are supplied into a photo-element PE by the indicated arrows. The photo-element is usually a photodiode whose properties at the electrical side are modeled with a corresponding network in a known way. An electrical signal thus arises at the electrical output O.

The transfer function of the entire transmission link can now be defined using widely known analysis and simulation. In addition, how current sources can be potentially replaced by voltage sources and how the parameters are then transformed are also adequately known from the theory of the electrical networks. It is also known how, given measured sub-transfer factors—or calculated sub-transfer factors in the case of beam tracking, the sub-transfer functions preferably presented by matrices are defined and how an overall transfer function can be calculated from them. Digital computers may preferably be used, particularly with the software packet SPICE established as a standard, for which various versions and numerous associated publications are available.

The method of ray tracing is preferably employed for the transfer function of the light conductor. The application of this to light conductors can be derived (among other things) from the previously mentioned document by Bierhoff et al. This is basically a problem of geometric optics whose solution is generally determinable. This solution presents no difficulties because the input rays are defined in a spatial direction and the transfer function, potentially time-dependent, can be defined by the intensity relative to the input intensity emerging at the referenced exit point. With the assistance of the values calculated in this way, as is likewise known from the theory of linear electrical networks, the transfer matrix can be calculated. The determination of the transfer functions with other numerical methods or by measurement is likewise possible.

Figure 4A:
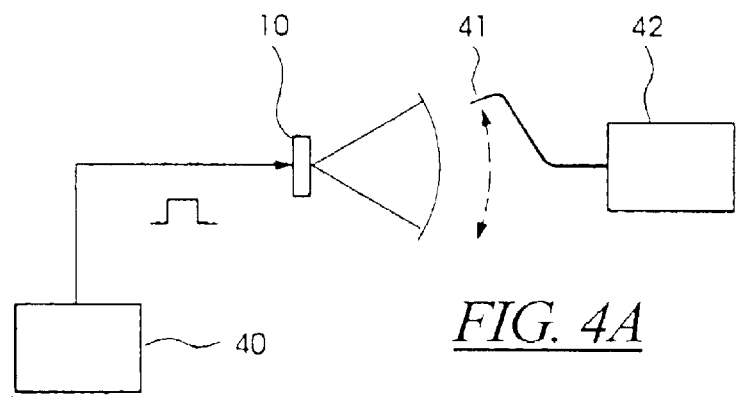
FIG. 4a is a schematic diagram showing an arrangement for determining the properties of the transmitter.

The allocation of the input/output channels to emission directions and, thus, ray cones, can be relatively well-governed by use of measurement in space. FIG. 4a outlines a corresponding arrangement. The transmission diode 10 is charged constantly or pulsed with a pulse source 40; in the latter instance, measurement is carried out during the on and off phases. An optical fiber 41 drawn to a thin tip serves the purpose of measurement, this accepting essentially only optical signals entering axially parallel at its tip and forwarding these to a light detector 42 arranged at the thicker output, from which the output signal is measured.

This optical fiber is moved into various positions in space with a mechanism known from robotics such that the axis of the tip of the optical fiber is directed in the direction opposite the center of the diode and a predetermined spacing from it is set.

The spatial distribution can thus be measured and, potentially after combining neighboring rays, defined. The control characteristics in the inside of the model of the diode are derived, as illustrated in FIG. 3, by the two arrows between the current through SD and the voltage U1 or, respectively, U2. An alternative to moving the measuring probe is to rotate and tilt the diode in kinematic reversal. When it can be assumed with adequate precision that the beam intensities are axially conically symmetrical, a corresponding rotation of the diode around one axis suffices that proceeds perpendicularly to the symmetry axis of the diode through the essentially punctiform emission spot.

Figure 4B:
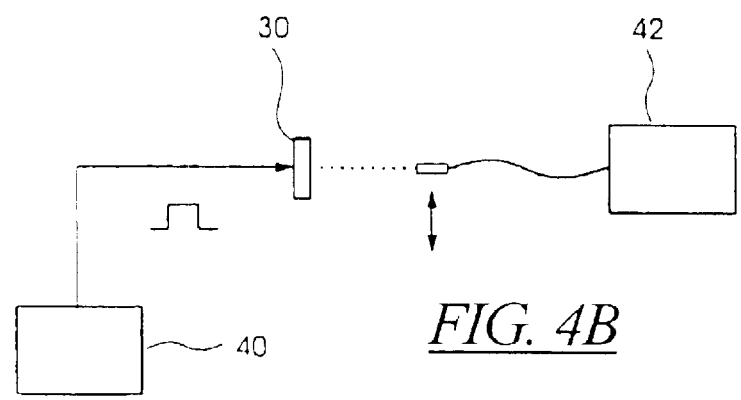
FIG. 4b is a schematic diagram showing an arrangement for determining the properties of the receiver.

A similar arrangement according to FIG. 4b is employed for measuring the properties of the receiver. The measuring device 42 is merely shifted transversely relative to the reception diode 30, i.e., it is rastered in Cartesian coordinates.

However, it is also provided to combine all concentrically placed spatial directions and, thus, to employ a cone sheath. This has the advantage that only relatively few of these channels are needed; these are preferably three channels: one for the cylindrical or conical central ray, the third for all signals having a large angle of incidence and a second for the part lying between them. However, a radial offset of the transmitter or, respectively, receiver can not be taken into consideration with this approach.

For greater clarity, the above description has particularly employed a model with concentrated elements for the optical transmission link. However, every model that can use a simulator can also be utilized for the optical transmission link. These, for example, are models for electrical waveguides or models of delayed current coupling. The model described in the initially cited article is preferably utilized which employs a convolution algebra and may likewise be made available in simulators. Furthermore, the calculation of the transmission properties can also take place using finite element models, even though high computational demands make this approach generally unattractive at the present time.

The above description implicitly assumed that a computer program for the simulation of electrical circuits is employed for the modeling. Of course, the method can also be applied in that the network is simulated by corresponding electrical circuits, usually after transformation into a suitable time and frequency domain. An example of such a simulator is notoriously known and described under the name "Analog Computer".

The above-described method and apparatus are illustrative of the principles of the present invention. Numerous modifications and adaptations thereof will be readily apparent to those skilled in this art without departing from the spirit and scope of the present invention.

What is claimed is:

1. An apparatus for modeling a transmission behavior of opto-electronic connections in which an electro-optical transmitter having an electrical terminal is connected via an optical conductor to an opto-electrical receiver, comprising:
- a transmitter sub-model that models said electro-optical transmitter, comprising an input post representing said electrical terminal, and at least n output posts, where $n \geq 2$, representing optical outputs and emission behavior of said electro-optical transmitter;
- a receiver sub-model that models said opto-electrical receiver, having m input posts, where $m \leq 2$, representing optical inputs and reception characteristics of said opto-electrical receiver;
- an optical conductor sub-model that models said optical conductor, and which connects said transmitter sub-model to said receiver sub-model, said optical conductor sub-model comprising n posts at an input to which said n output posts of said transmitter sub-model are connected, and said optical conductor sub-model further comprising m posts at an output to which said m input posts of said receiver sub-model are connected;
- a component selected from the group consisting of an emission component and a reception component defined by a spatial distribution of optical signals.

2. An apparatus according to claim 1, wherein said emission behavior of the transmitter is acquired by a division into steric light bundles emanating from a beam center, and said reception characteristic is acquired by a tiling of a reception plane.

3. An apparatus according to claim 1, wherein said optical conductor sub-model is acquired by ray tracing.

4. An apparatus according to claim 1, wherein said optical conductor sub-model is determined by measurement.

5. An apparatus according to claim 1, wherein said optical conductor sub-model is calculated by numerical methods.

6. An apparatus according to claim 1, wherein said transmitter sub-model with respect to the spatial distribution is acquired by measurement with an approximately punctiform sensor that is spatially moved in an emission region.

7. An apparatus according to claim 1, wherein said receiver sub-model with respect to the spatial distribution is acquired by measurement with an approximately punctiform emitter that is spatially moved in a reception region.

8. A method for determining the transmission behavior of opto-electronic connections, in which an electro-optical transmitter is connected via an optical conductor to an opto-electrical receiver by measuring or calculating at a purely electrical network, comprising the steps of:

- defining spatially quantized an optical signal emitted by said transmitter dependent on a supplied electrical signal into at least two emission components;
- determining an electrical signal output by said receiver as a function of optical sensitivity spatially quantized in at least two reception components;
- dividing an entry face of said optical conductor facing toward said transmitter into entry sub-faces that correspond to said emission components of said transmitter;
- dividing an exit face of said optical conductor facing toward said receiver into exit sub-faces that correspond to said reception components of said receiver;
- determining a transfer function of said optical conductor by said entry sub-faces relative to said exit sub-faces; and
- inputting said transfer function into either parameter values of an electrical circuit or into a simulator for electrical circuits.

9. A method according to claim 8, wherein said emission components of said transmitter are acquired by a division into steric light beams proceeding from a light beam center, said reception components being acquired by a tiling of a reception plane.

10. A method according to claim 8, wherein said emission components of said transmitter, as a planar radiator, are acquired by a division into light rays emanating from a plurality of source points, said reception components being acquired by a corresponding tiling of a reception plane.

11. A method according to claim 8, wherein said transfer function of said optical conductor is acquired by ray tracing.

12. A method according to claim 8, wherein said transfer function of optical conductor is acquired by measurements.

13. A method according to claim 8, whereby the transfer function of said optical conductor is acquired by arbitrary numerical methods.

14. A method according to claim 8, further comprising the step of acquiring transmitter transfer functions with respect to a spatial distribution of emitted optical power by measurement with an approximately punctiform sensor that is spacially moved in an emission region.

15. A method according to claim 8, further comprising the step of acquiring receiver transfer functions with respect to a spatial distribution of emitted optical power by measurement with an approximately punctiform emitter that is spatially moved in a reception region.

* * * * *